(12) United States Patent
Ganesan (10) Patent No.: US 10,979,396 B2
(45) Date of Patent: Apr. 13, 2021

(54) AUGMENTED DESIGN FOR A TRIPLE BLINDED IDENTITY SYSTEM

(71) Applicant: Ravi Ganesan, San Diego, CA (US)

(72) Inventor: Ravi Ganesan, San Diego, CA (US)

( * ) Notice: Subject to any disclaimer, the term of this patent is extended or adjusted under 35 U.S.C. 154(b) by 766 days.

(21) Appl. No.: 15/477,077

(22) Filed: Apr. 1, 2017

(65) Prior Publication Data

US 2018/0288008 A1 Oct. 4, 2018

Related U.S. Application Data

(63) Continuation-in-part of application No. 15/164,776, filed on May 25, 2016, now Pat. No. 10,305,886.

(51) Int. Cl.
*H04L 29/06* (2006.01)
*H04L 9/32* (2006.01)

(52) U.S. Cl.
CPC ........ *H04L 63/0281* (2013.01); *H04L 9/3263* (2013.01); *H04L 63/0407* (2013.01); *H04L 63/0815* (2013.01); *H04L 63/0823* (2013.01); *H04L 2209/04* (2013.01)

(58) Field of Classification Search
CPC ............. H04L 63/0407; H04L 63/0281; H04L 63/0823; H04L 63/0815; H04L 9/3263; H04L 2209/04
See application file for complete search history.

(56) References Cited

U.S. PATENT DOCUMENTS

| 7,181,017 | B1 * | 2/2007 | Nagel | H04L 9/0825 380/282 |
|---|---|---|---|---|
| 8,843,997 | B1 * | 9/2014 | Hare | H04L 63/0281 709/200 |
| 2002/0004900 | A1 * | 1/2002 | Patel | G06Q 30/02 713/155 |
| 2003/0182421 | A1 * | 9/2003 | Faybishenko | H04L 63/08 709/224 |
| 2005/0289084 | A1 * | 12/2005 | Thayer | G06O 20/3674 705/67 |
| 2012/0278872 | A1 * | 11/2012 | Woelfel | H04L 61/2596 726/7 |
| 2013/0227140 | A1 * | 8/2013 | Hinton | H04L 41/00 709/225 |
| 2014/0059693 | A1 * | 2/2014 | Stecher | G06F 21/45 726/26 |
| 2018/0288008 | A1 * | 10/2018 | Ganesan | H04L 9/3263 |

* cited by examiner

*Primary Examiner* — Matthew T Henning
(74) *Attorney, Agent, or Firm* — Sughrue Mion, PLLC (57) ABSTRACT

A method comprising: when a user attempts to access: redirecting the user to a Triple Blind Identity Exchange Service (TBIES) Discovery Service (TBIES DS); redirecting, by the TBIES DS, the user back while providing a blinded name of a selected Identity Provider (IdP), redirecting the user to a TBIES-Service Provider (SP) proxy with a federation request; and blinding, by the TBIES-SP proxy, the identity of the SP and any user identifiable data and redirecting the user to a TBIES-IdP proxy, which performs any required data manipulation and redirects the user to the IdP. The IdP authenticates the user, and redirects the user to the TBIES-IdP proxy, which blinds the identity of the IdP, blinds all user information, and redirects to the SP-Proxy, which unblinds the transaction and redirects the user to the SP, where the SP consumes the assertion and decides whether to permit the user access.

12 Claims, 8 Drawing Sheets

AUGMENTED DESIGN FOR A TRIPLE BLINDED IDENTITY SYSTEM

RELATED APPLICATIONS

This application claims priority based on U.S. application Ser. No. 15/164,776 filed May 25, 2016, and entitled "A NEW DESIGN FOR A TRIPLE BLIND IDENTITY EXCHANGE", and, Provisional U.S. application Ser. No. 62/166,721 filed May 27, 2015, and entitled "A NEW DESIGN FOR A TRIPLE BLIND IDENTITY EXCHANGE_", the contents of both of which are incorporated herein in their entirety by reference.

TECHNICAL FIELD

This invention relates to security and privacy. Specifically it relates to a method to provide double or triple blinded identity eco systems.

BACKGROUND OF THE INVENTION

Figure 1:
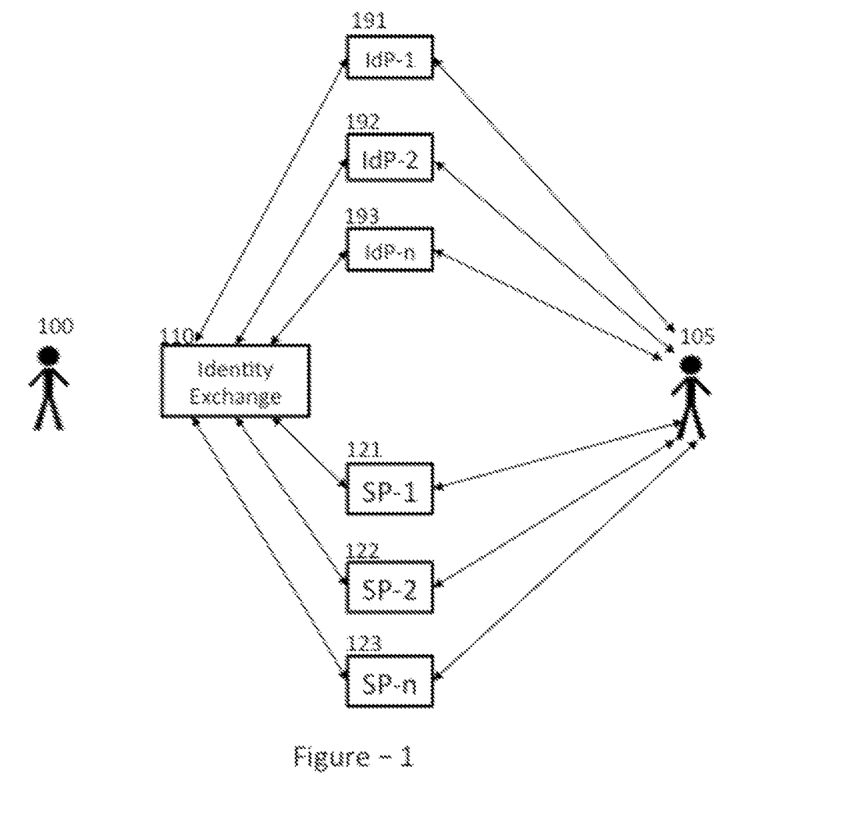
FIG. 1 shows a classic identity eco-system. User (105) is shown interacting WITHOUT an Identity Exchange and User (100) is shown interacting WITH an Identity Exchange.

If a user Alice wishes to access her patient portal at her medical provider, she typically has to obtain unique credentials (e.g. UserID/Password) for the patient portal. However, Alice typically would also have credentials from other sites, such as those for her on-line banking site or those from her employer. The notion that can Alice can leverage the credential issued by one entity to access another entity is the concept of an identity federation. As shown in FIG. 1, user Alice (105) will go to a service provider, say SP-1 (121), be redirected to an identity provider, say IdP-1 (191), get authenticated and then return to SP-1 with an 'assertion' from the identity provider attesting (or not) to her identity.

The technology and standards for achieving identity federations have existed in various forms for many decades. Standards such as SAML and OpenID have similarly been in existence for a long time. In terms of adoption such cross-organization identity federation has not seen widespread adoption. Rather the technology (sometimes called single sign-on or SSO) is used more widely within a given organization to allow users to use a single credential to access multiple services. There are several reasons why cross organizational identity federations have been slow to be adopted. First, there is the "n squared connections" problem wherein for n organizations to cooperate in a federation about "n squared" connections will have to be maintained. Further, while there is standardization happening, there still exist multiple standards, and even the implementation of a given standard can have variability.

Identity Exchanges have started appearing as a potential solution to some of these problems. As shown in FIG. 1 an Identity Exchange (110) acts as a "switchboard" between the various entities (121, 122, 123, ... 191, 192, 193, ... ) in the federation. The entities provided identity assertions are referred to as Identity Providers (IdP) and the entities consuming identity assertions are referred to as Relying Parties (RP, also knows as the Service Provider, SP). In a typical flow the user (100) visits the SP (say 121) site, is prompted to select the IdP (say 191) they wish to use to log in and is redirected to the IdP via the Identity Exchange (110) with a identity assertion request. The IdP authenticates the user, creates a response consisting of an identity assertion and the user is directed back to the SP via the Identity Exchange. In this model each IdP and SP has to maintain a single connection to the Identity Exchange solving the "n squared" problem. Further, the Identity Exchange can perform protocol translations and allow for interoperability There is a further problem which identity federations can help solve, namely, in our description above when Alice selects the IdP she wants to use, the SP learns the name of that IdP. Further, when the IdP provides the response it learns which SP Alice is visiting. To bring it back to our original example, if Alice user her on-line banking credential to log in to her patient portal at her health clinic, then the health clinic learns where she banks, and the bank knows which health clinic she is visiting. In some cases this can result in an unacceptable loss of privacy. To solve this issue the notion of double blinded Identity Exchanges were introduced and are currently used in some countries for government run Identity Exchanges. Here the Identity Exchange acts as a middleman which shields the true identity of the IdP from the SP and that of the SP from the IdP.

The central problem with Identity Exchanges is that the exchange itself becomes a single point through which all traffic flows and a security failure at the exchange itself will be catastrophic. For a comprehensive description of the importance of this problem the interested reader is referred to "Privacy Enhanced Identity Brokers", published on Oct. 19, 2015 by the National Cyber Security Center of Excellence a part of the National Institute of Standards and Technology (NIST). See https://nccoe.nist.gov/sites/default/files/library/project-descriptions/privacy-enhanced-identity-brokers-project-description-draft.pdf.

In prior work (see U.S. application Ser. No. 15/164,776 filed May 26, 2016, and entitled "A NEW DESIGN FOR A TRIPLE BLIND IDENTITY EXCHANGE") we described an innovative way to achieve triple blinding by encrypting only attribute values using a session key shared between each IdP and SP. This session key is exchanged periodically using any PKI based key exchange protocol; and the anonymity is maintained by the novel application of short lived anonymous certificates to the triple blinding problem.

In this work we augment the above architecture with a special Discovery Service and also extend it to the use case where the user wants to keep their own identity anonymous. The introduction of the Discovery Service allows the system described here to also work for the use case when there is no identity exchange.

OBJECTIVES OF THE INVENTION

This invention has the following objectives:

Develop a new type of triple blinded Identity Exchange which does is not vulnerable to catastrophic failure using a Certificate Authority that issues anonymous certificates, and a special discovery service.

Apply the above concepts to the use case when there is no Identity Exchange to shield the identity of the IdP and the SP from each other.

In either of the above situations create a new method of allowing the user to maintain the anonymity of their own identity.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

No Identity Exchange Present:

New methods to allow a TBIES Discovery Service (TBIES DS) and a Certificate Authority (CA) that can issue anonymous certificates to cooperate to allow a federation protocol to run between an Identity Provider (IdP) and Service Provider (SP) wherein: the User goes to the SP and tries to access a protected resource; the User is redirected to the 3BIES Discovery Service where they select their IdP. The DS then redirects the User back to the SP providing the blinded name of the IdP; the SP redirects the User to the 3BIES-SP-Proxy with a Federation Request. The proxy blinds the identity of the SP and any user identifiable data and redirects the user to the 3BIES-IdP-Proxy which performs any required data manipulation and redirects the User to the IdP; the IdP authenticates the user, and, the IdP then redirects the User to the IdP-Proxy which blinds the identity of the IdP, blinds all user information, and redirects to the SP-Proxy. The SP-Proxy unblinds the transaction and in turn redirects the User to the SP. The SP consumes the assertion and decides whether to permit the User access. The IdP/SP and/or their respective 3BIES proxies are issued short lived anonymous certificates by a Certificate Authority, to which they may authenticate using regular long lived certificates, and with the Certificate Authority maintaining a mapping between actual identities and anonymous identities. The 3BIES Discovery Service issues anonymized DNS entries with associated IP addresses to the IdP/SP and/or their associated proxies, allows the IdP organization to maintain (create, read, update, delete) a list of SPs it is willing to service, allows the SP organization to maintain (create, read, update, delete) a list of IdPs it is willing to trust and when SPs redirect users to it, it shows them a list of IdPs that meet all conditions. The 3BIES-Proxies can be hosted as a cloud service, be on-premise or integrated completely into the IdP or SP software. Optionally each pair of IdP-SP and/or their associated proxies, which are willing to trust/service each other exchange short lived session keys using protocols such as SSL or MashSSL. This key can be used to encrypt user information in the cases where it is desired that the user not be able to see the data.

Identity Exchange IS Present:

A TBIES Discovery Service (TBIES DS) and a Certificate Authority (CA) that can issue anonymous certificates to cooperate to allow a federation protocol to run between an Identity Provider (IdP) and Service Provider (SP) when there is an Identity Exchange (IE) present, wherein: The User goes to the SP and tries to access a protected resource; The User is redirected to the 3BIES Discovery Service where they select their IdP. The DS then redirects the User back to the SP providing the blinded name of the IdP; The SP redirects the User to the 3BIES-SP-Proxy with a Federation Request. The proxy blinds the identity of the SP and any user identifiable data and redirects the user to the IE. The IE performs any protocol manipulation necessary and redirects the user to the 3BIES-IdP-Proxy which performs any required data manipulation and redirects the User to the IdP; The IdP authenticates the user as happens traditionally; The IdP then redirects the User to the IdP-Proxy which blinds the identity of the IdP, blinds all user information, and redirects to the IE. The IE performs any protocol manipulation necessary and redirects to the SP-Proxy. The SP-Proxy unblinds the transaction and in turn redirects the User to the SP. The SP consumes the assertion and decides whether to permit the User access. The IdP/SP and/or their respective 3BIES proxies and the IE are issued short lived anonymous certificates by a Certificate Authority, to which they may authenticate using regular long lived certificates, and with the Certificate Authority maintaining a mapping between actual identities and anonymous identities. The 3BIES Discovery Service issues anonymized DNS entries with associated IP addresses to the IdP/SP and/or their associated proxies, allows the IdP organization to maintain (create, read, update, delete) a list of SPs it is willing to service, allows the SP organization to maintain (create, read, update, delete) a list of IdPs it is willing to trust and when SPs redirect users to it, it shows them a list of IdPs that meet all conditions. The 3BIES-Proxies can be hosted as a cloud service, be on-premise or integrated completely into the IdP or SP software. Each pair of IdP-SP and/or their associated proxies, which are willing to trust/service each other exchange short lived session keys using protocols such as SSL or MashSSL.

BRIEF DESCRIPTION OF DRAWINGS

Note: in all Figures we identify each component by xyz where x is the figure number, y is the type of component (same across all figures) and z refers to a particular instance of a type of component. In the flow diagrams we only need to show one instance of each component so we set z as 0.

FIG. 8 shows the Flow Diagram with blinding when Identity Exchange (IE) is present.

PREFERRED EMBODIMENT(S) OF THE INVENTION

Our preferred embodiment is described below first by defining the terminology, then identifying the architectural components and then describing the process flow. Please note: in all Figures we identify each component by xyz where x is the figure number, y is the type of component (same across all figures) and z refers to a particular instance of a type of component. In the flow diagrams we only need to show one instance of each component so we set z as 0.

Terminology

For our purposes we will use the following terms as defined below:

Identity Provider (IdP): The entity with which the user has a pre-established an identity and with which they have a credential.

Service Provider (SP): Also known as the Relying Party (RP) this is the entity the user is trying to access using their credentials from the IdP.

Discovery Service: The process by which the SP determines which of the IdPs it trusts the user wants to use. Traditionally the SP offers list to the user to select from.

Blinded Discovery Service (DS). Here the SP should not know the IdP the user selects, and therefore a third party intermediary is necessary. The Blinded Discovery System and the Certificate Authority described below know the mapping from the real identities of the IdP and SP to their anonymous identities.

Federation Request: This is typically the message from the SP to the IdP requesting that the IdP authenticate the user if possible.

Blinded Federation Request: The federated request with the identity of the SP and all user information blinded.

Authentication. Before the IdP can fulfill a SP Request it needs to authenticate the user. This typically involves the user using their credential to prove their identity to the IdP. The IdP may have a pre-authenticated connection to the user in which case this step does not involve direct user action unless the SP requested fresh authentication.

Federation Response or Assertion: This is typically the message from the IdP to the SP communicating the result of the authentication.

Blinded Federation Response or Assertion: Similar to above except the SP does not know the true identity of the IdP making the assertion.

Attributes: In addition to the IdP asserting that "Yes, this is Alice", the IdP in many cases communicates attributes about the user to the SP. This can happen as part of the federation-protocol-assertion, or else the assertion can communicate a "ticket" to the SP which allows the SP to 'pull' the attributes directly from the IdP at a later point.

Identity Exchange (IE): As a typical eco-system contains many IdPs and SPs, it is often convenient to introduce an "exchange" that acts as the single interface to each IdP and SP, and facilitates connectivity.

Components

The various components of the 3BIES system are as follows:

The users (100, 200, . . . 800, 105)

The various Identity Providers (191-193, 291-293, 391-393, 491-493, 590, 690, 790, 890).

The various Service Providers (121-123, 221-223, 321-323, 421-423, 520, 610, 810).

The 3BIES IdP Proxy which "front ends" each of the IdPs (211-213, 311-313, 411-413, 610, 810). In the figure below these are shown to be in a cloud. However, it must be understood that these proxies are under the control of their respective IdPs. Whether they are part of a cloud based service, are on premise of the IdPs, or even directly integrated into the federation software at the IdPs is orthogonal to the architecture and design. In all cases the data that flows through the proxy is under the control of the IdP and not under the control of other entities.

The 3BIES SP Proxy which "front ends" each of the IdPs (281-283, 381-383, 481-483, 680, 880). In the figure below these are shown to be in a cloud. However, it must be understood that these proxies are under the control of their respective SPs. Whether they are part of a cloud based service, are on premise of the SPs, or even directly integrated into the federation software at the SPs is orthogonal to the architecture and design. In all cases the data that flows through the proxy is under the control of the SP and not under the control of other entities.

Figure 2:
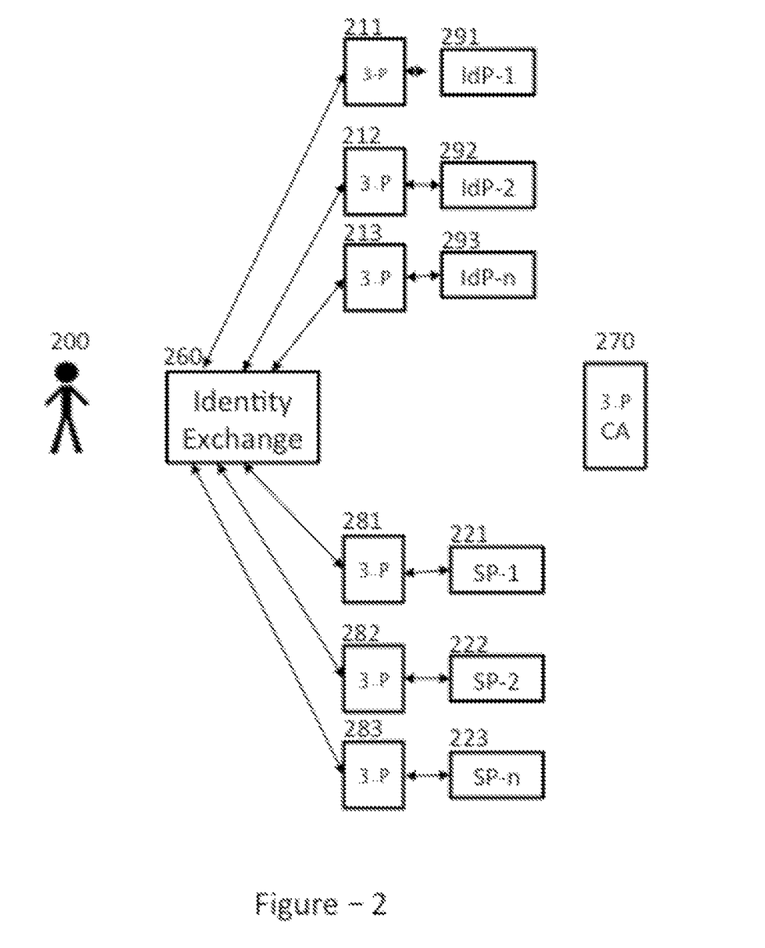
FIG. 2 shows blinding WITHOUT a Discovery Service (earlier patent) for case when Identity Exchange is present.
Figure 3:
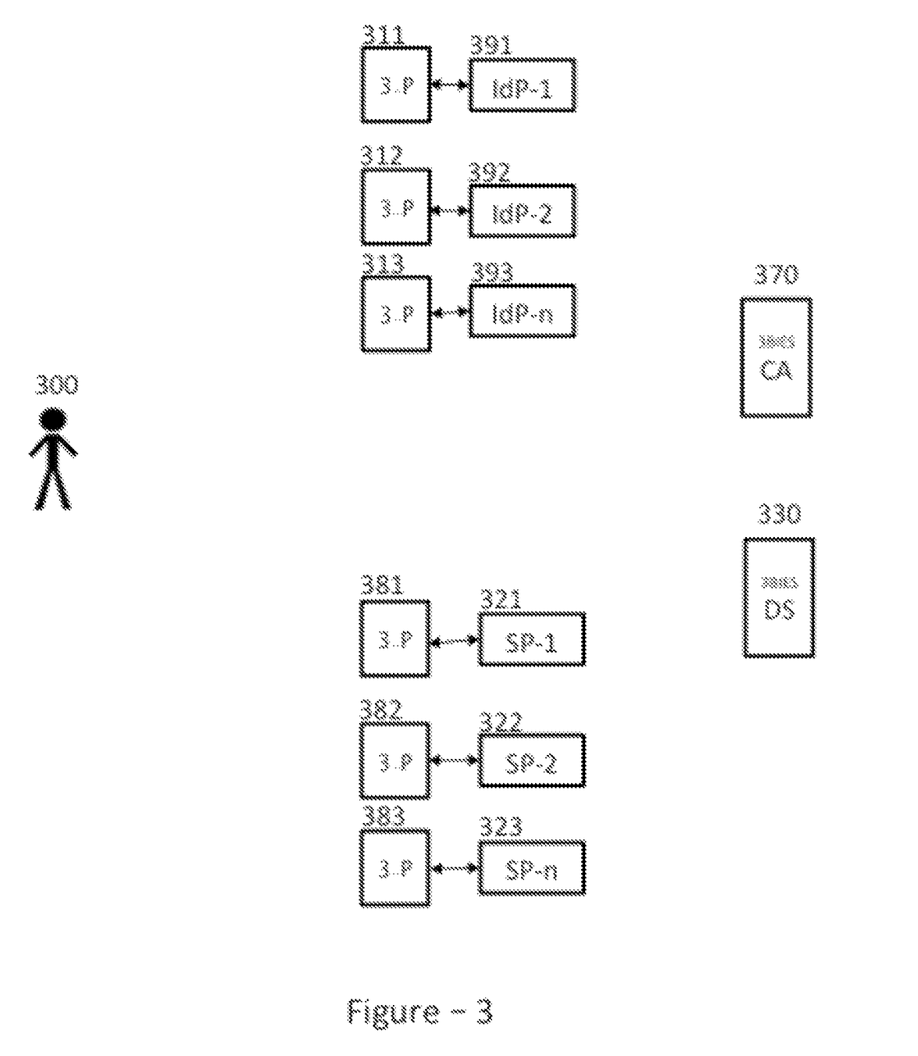
FIG. 3 shows the architecture of Blinding with Discovery Service for case WITHOUT an Identity Exchange.
Figure 4:
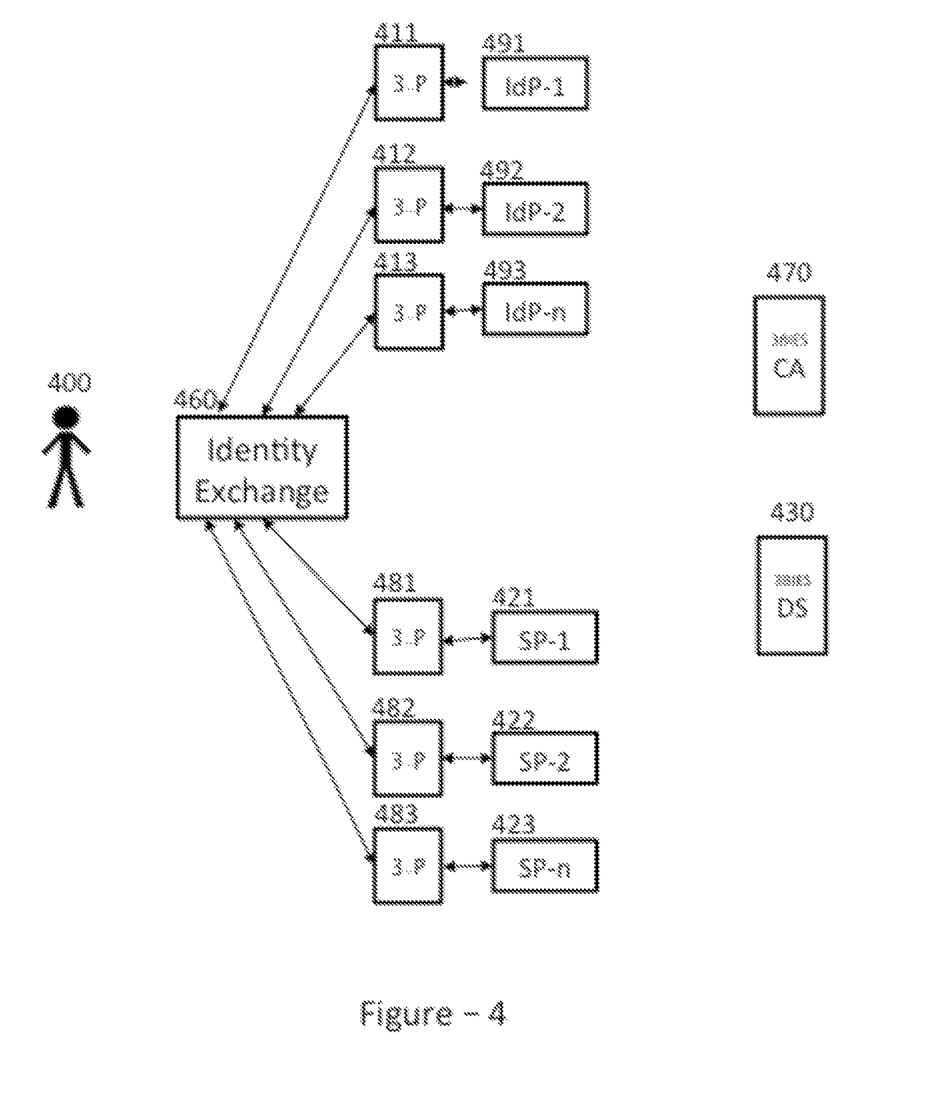
FIG. 4 shows the architecture of Triple Blinding with Discovery Service for case when Identity Exchange is present.

The 3BIES Certificate Authority (270, 370, 470) is a CA that provides both long lived certificates as well as short lived anonymous certificates to the proxy servers. It is assumed that the 3BIES CA (i) is run by an independent entity (independent of the IdPs, SPs and the 3BIES Discovery Service), and, (ii) does not see any of the federation protocol traffic.

The 3BIES Discovery Service (330, 430, 660, 860) is run by another independent entity. Like the 3BIES CA it too does not see any of the federation protocol traffic.

The Identity Exchange (260, 460, 760, 860). As stated earlier our design encompasses two use cases, one in which all traffic is routed through the identity exchange, and the other more traditional use case where there is no exchange. In the former case, in our design the identity exchange only sees blinded traffic. It can perform manipulations such as protocol conversions but does so without seeing any user information.

The Discovery Service

In order to perform the blinding the 3BIES Discovery Service (DS) performs certain functions beyond the traditional process of discovery of the User's preferred IdP. Further, as we shall see shortly it is important in our design that 3BIES-IdP-Proxies and 3BIES-SP-Proxies be able to communicate with each other both directly (for key exchange) and indirectly a part of the flows described earlier. This is achieved by providing the Proxies short lived anonymous domain names, with the DS maintaining the mapping between the actual names of the Proxies and their anonymous handles.

The DS works as follows:

IdP/SP Administration: Authorized representatives of each IdP and SP in a 3BIES system authenticate to the DS, and register their proxy. They do this by providing the long-lived certificate of their proxy to the DS. For each IdP the representative maintains on the DS, a list of 3BIES SPs they are willing to service. For each SP the representative maintains on the DS, a list of 3BIES IdPs they are willing to accept assertions from.

DNS Anoymization: Each 3BIES IdP/SP proxy is required to obtain a short-lived domain name and IP address. It does this using a DNS server maintained as part of the DS. The DS maintains a mapping between the actual proxy identity and its anonymous name.

DS Directory Service: All entities (especially the IdPs) need to know the fresh anonymous names of the entities they communicate with. The entities make a "give me the list of entities I need to trust" call out to the DS periodically and get back a list of anonymous domain names.

Flow Integration: When the User is redirected to the DS during the course of discovery the DS presents the User with a list of potential IdPs made up of the subset of the IdPs that SP has listed as trusted and those which are willing to service that SP. The SP then returns the anonymized name for the IdP-Proxy for that IdP. The actual protocol for the communication between the SP and the DS can be made using for instance, the SAML specification for discovery described in the OASIS Identity Provider Discovery Service Protocol and Profile.

Note that the DS interacts with the 3BIES CA to obtain a long lived certificate for itself.

Key Management & the Certificate Authority (CA)

We now describe the keys that used in the 3BIES system:

Root Certificate: For simplicity of explanation we assume there is a unique Root CA to which these certificates chain up and which is available to all entities. This is easily extended to a set of Root CAs that each entity in the system is willing to trust.

Long-lived Certificates. Each entity in the system including the IdPs, SPs, DS, Proxies and IE has a unique long-lived certificate issued to them by the CA. The process for obtaining and maintaining these certificates will follow the typical off-line process involving a human that Certificate Authorities support.

Short-Lived Certificates. The Proxies also have short-lived certificates, which are obtained from the CA. The protocol for obtaining these certificates can be automated.

Symmetric Encryption Session Keys. The IdP and SP proxies perform pair wise blinding using standard symmetric key encryption. To do this they need to perform a pair wise key exchange using key exchange protocols, using protocols such as SSL or MashSSL. The frequency of key exchange represents a trade off between performance and security. We believe that once a day is a good point in this trade-off, but changing this frequency does not impact the design.

Proxy Service

The primary function of the proxies is to blind/un-blind user identifiable information. This is done by encrypting/decrypting the values of the name-value pairs as Federation Requests and Assertions flow through them as described earlier. This is achieved as follows:

Proxies obtain long-lived certificates by interacting with the CA using a manual process.

Proxies periodically obtain short-lived certificates by using an automated process with the CA.

Proxies periodically register with the DS as part of obtaining short lived domain names and IP addresses.

Proxies periodically exchange short lived session keys with each other using the key exchange mechanism described earlier.

When Federation requests and assertions flow through them, the Proxies either blind (encrypt) or un-blind (decrypt) data flowing through them. This will be done using standard symmetric block ciphers.

Data Flows

Figure 5:
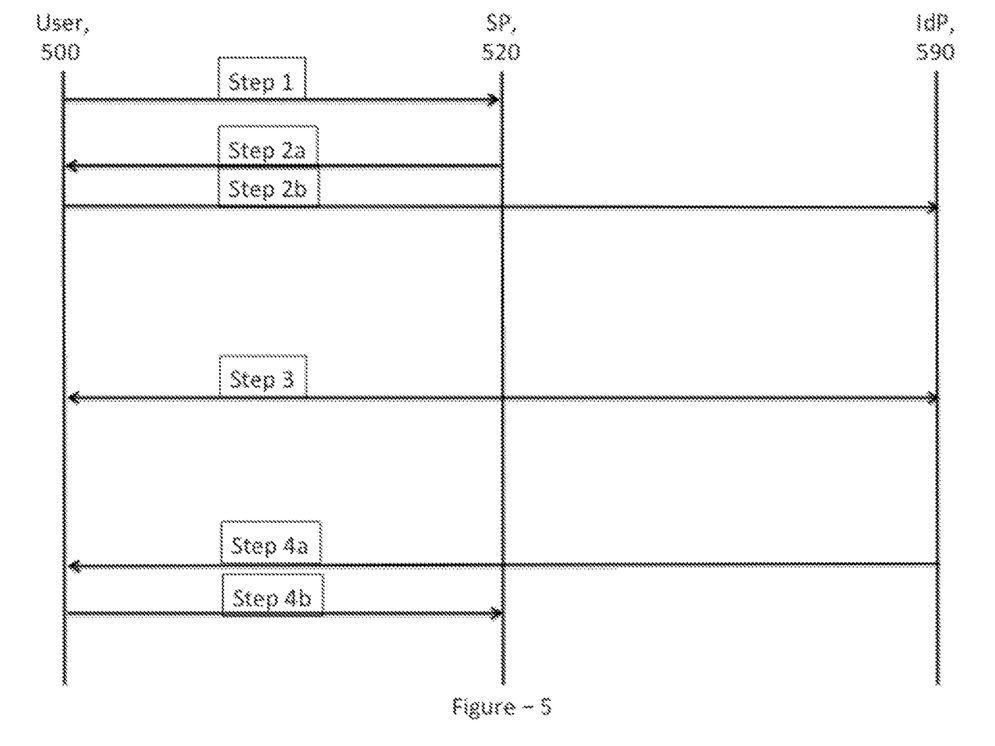
FIG. 5 shows the Flow Diagram for customary identity federation flow.

Classic Identity Eco System Flow (Reference FIG. 5)

The classic identity eco-system flow has the following four steps:

Step 1 the user (500) goes to the SP (520) and tries to access a protected resource. The User and SP go through a discovery process to select which IdP the user wishes to use.

Step 2a and 2b: The user is redirected to the IdP (590) with a Federation Request (typically via the User's browser).

Step 3: The IdP authenticates the user

Step 4a and 4b: The user is redirected back to the SP with a Federation Assertion. The SP consumes the assertion and decides whether to allow the user access.

Figure 7:
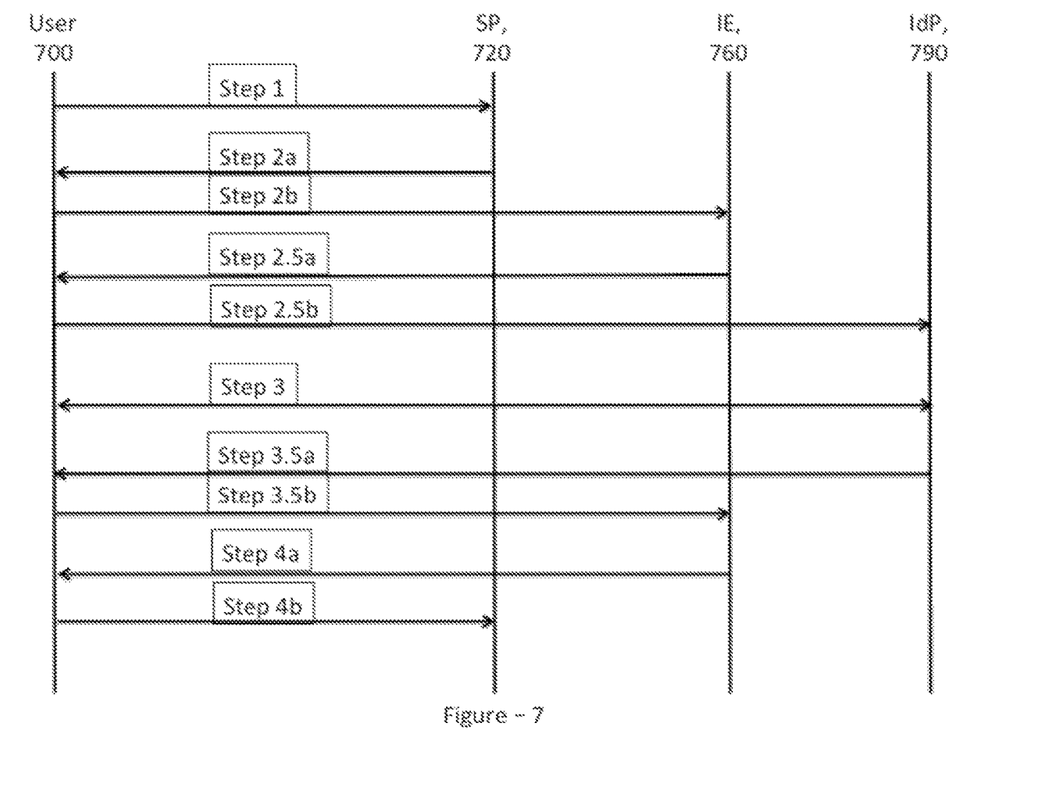
FIG. 7 shows the Flow Diagram for customary identity federation when Identity Exchange (IE) is present.

Identity Eco System with an Exchange Flow (Reference FIG. 7)

With the introduction of an identity exchange the steps are as follows:

Step 1 the user (700) goes to the SP (720) and tries to access a protected resource. The User, the SP and potentially the IE (760) go through a discovery process to select which IdP (790) the user wishes to use. If the exchange supports double blinding the exchange will be the third party that performs the blinding and the user typically selects the IdP at the IE.

Step 2a and 2b: The user is redirected to the IE with a Federation Request (typically via the User's browser).

Step 2.5a and 2.5b: The IE performs any protocol manipulation that is needed and redirects the user to the IdP.

Step 3: The IdP authenticates the user

Step 3a and 3b: The IdP constructs an assertion and redirects the User back to the IE.

Step 4a and 4b: The user is redirected back to the SP by the IE with a Federation Assertion. The SP consumes the assertion and decides whether to allow the user access.

TBIES: Classic Identity Eco System Flow (Reference FIG. 6)

Figure 6:
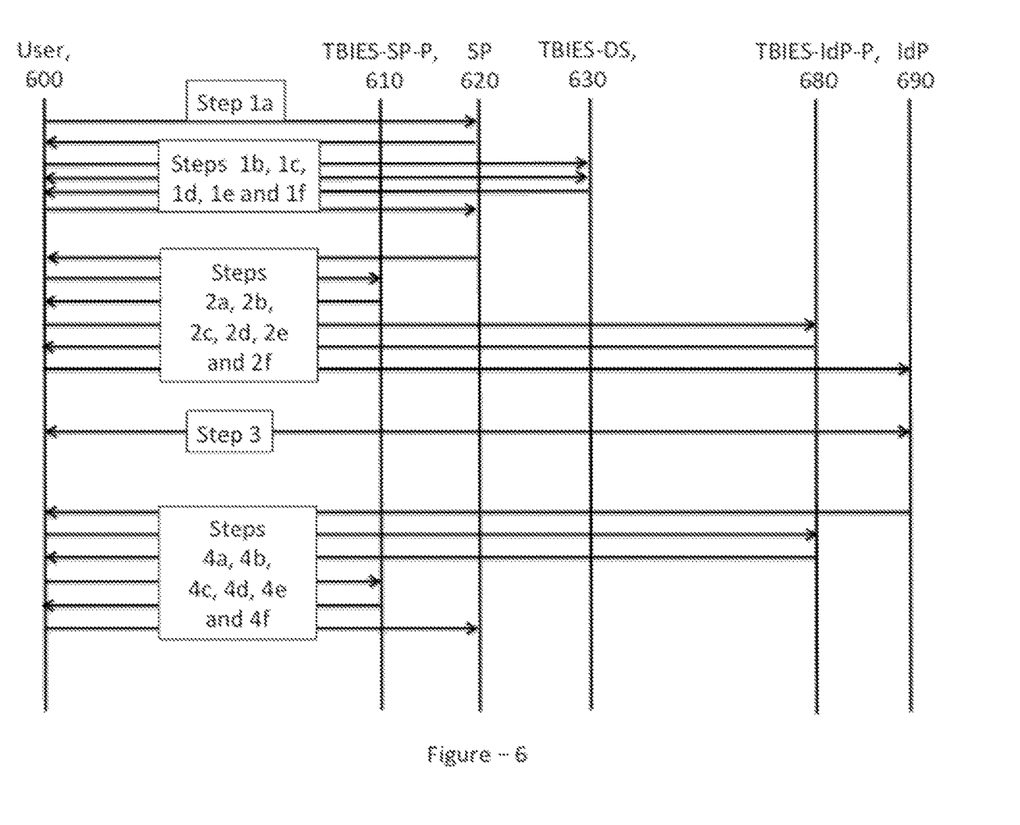
FIG. 6 shows the Flow Diagram for 3BIES blinding when Identity Exchange is not present.

Before introducing the Identity Exchange into the picture it is useful to first see how the 3BIES architecture provides double blinding for traditional identity eco-systems which do not have an exchange. The steps are:

Step 1a: The User (600) goes to the SP (620) and tries to access a protected resource.

Step 1b, 1c, 1d and 1e: The User is redirected to the 3BIES Discovery Service (630) where they select their IdP (690). The DS then redirects the User back to the SP providing the blinded name of the IdP.

Step 2a, 2b, 2c, 2d, 2e and 2f: The SP redirects the User to the 3BIES-SP-Proxy (610) with a Federation Request. The proxy blinds the identity of the SP and any user identifiable data and redirects the user to the 3BIES-IdP-Proxy (680) which performs any required data manipulation and redirects the User to the IdP.

Step 3: The IdP authenticates the user as happens traditionally.

Step 4a, 4b, 4c, 4d, 4e and 4f: The IdP then redirects the User to the IdP-Proxy which blinds the identity of the IdP, blinds all user information, and redirects to the SP-Proxy. The SP-Proxy unblinds the transaction and in turn redirects the User to the SP. The SP consumes the assertion and decides whether to permit the User access.

OPTIONAL: Each pair of IdP-SP and/or their associated proxies, which are willing to trust/service each other exchange short lived session keys using protocols such as SSL or MashSSL. This key can be used to encrypt user information in the cases where it is desired that the user not be able to see the data.

TBIES: Identity Eco System with Exchange Flow (Reference FIG. 8)

With the Identity Exchange in the picture the flow remains essentially the same except that there is an extra step of indirection through the Exchange in both directions. The steps are:

Step 1a: The User (800) goes to the SP (810) and tries to access a protected resource.

Step 1b, 1c, 1d and 1e: The User is redirected to the 3BIES Discovery Service (830) where they select their IdP. The DS then redirects the User back to the SP providing the blinded name of the IdP (890).

Step 2a, 2b, 2c, 2d, 2e, 2f, 2g and 2h: The SP redirects the User to the 3BIES-SP-Proxy (810) with a Federation Request. The proxy blinds the identity of the SP and any user identifiable data and redirects the user to the IE (860). The IE performs any protocol manipulation necessary and redirects the user to the 3BIES-IdP- Proxy (880) which performs any required data manipulation and redirects User to the IdP.

Step 3: The IdP authenticates the user as happens traditionally.

Step 4a, 4b, 4c, 4d, 4e, 4f, 4g and 4h: The IdP then redirects the User to the IdP-Proxy which blinds the identity of the IdP, blinds all user information, and redirects to the IE. The IE performs any protocol manipulation necessary and redirects to the SP-Proxy. The SP-Proxy unblinds the transaction and in turn redirects the User to the SP. The SP consumes the assertion and decides whether to permit the User access.

Anonymizing User Identity

In either of the two use cases described above (with and w/o identity exchanges), in our architecture it is possible for the user at time of authentication by the IdP to make a request requesting that the user's identity be anonymized and not shared with the SP. The SP will know that it is a "legitimate user per the IdP" but not learn the user's identity. Please see the HIMSS committee's paper http://www.himss.org/sites/himssorg/files/HIMSSorg/patient-portal-id-proofing-authentication.pdf (which this author) co-wrote for the motivation of this use case in the American health care system.

What is claimed is:

1. A method comprising:
   issuing, by a Certificate Authority (CA), anonymous certificates;
   assigning, by a Discovery Service (DS) server, an anonymous domain name and associated internet protocol (IP) address to each of an Identity Provider (IdP) proxy, and a Service Provider (SP) proxy, wherein the DS server maintains a mapping between actual names of the proxies and their assigned anonymous domain names;
   obtaining, by the IdP proxy, the anonymous domain name and the associated IP address of the SP proxy, and obtaining, by the SP Proxy, the anonymous domain name and IP address of the IdP proxy; and
   when a user attempts to access a protected resource of an SP that corresponds to the SP proxy;
   redirecting, by the SP, the user to the DS server;
   prompting, by the DS server, a user to select an IdP from a list of a plurality of IdPs;
   redirecting, by the DS server, the user back to the SP while providing the anonymous domain name of the selected IdP;
   redirecting, by the SP, the user to the SP proxy with a federation request; and
   encrypting, by the SP proxy, any user identifiable data and redirecting, by the SP proxy, the user to the IdP proxy corresponding to the selected IdP, wherein the IdP proxy decrypts the user identifiable data, and redirects the user to the IdP, wherein the IdP authenticates the user, and then redirects the user to the IdP proxy, which encrypts all user information, and redirects to the SP proxy, which decrypts a transaction and in turn redirects the user to the SP, where the SP consumes an identity assertion and decides whether to permit the user access, wherein the IdP provides identity assertions, and the SP consumes the identity assertions.

2. The method according to claim 1, wherein at least one of the IdP, the SP, the IdP proxy or the SP proxy is issued a short lived anonymous certificate by the CA, to which the at least one of the IdP, the SP, the IdP proxy or the SP proxy may authenticate using regular long lived certificates, wherein the short lived anonymous certificate is not as long as the regular long lived certificates.

3. The method according to claim 1, wherein the DS server:
   issues anonymized Domain Name Service (DNS) entries with the associated IP addresses to at least one of the IdP, the SP, the IdP proxy or the SP proxy,
   maintains a first list of SPs that an organization associated with the IdP is willing to service,
   maintains a second list of IdPs that the SP trusts, and
   when the SP redirects the user to the DS server, shows them a third list of IdPs that the SP trusts that are willing to service the SP, wherein the maintaining includes at least one of: creating, reading, updating or deleting.

4. The method according to claim 1, wherein the IdP proxy and the SP proxy are each hosted as a cloud service, which are one of on-premise or integrated completely into respective IdP or SP software.

5. The method according to claim 1, wherein
   the method further comprises, exchanging, by the IdP proxy and the SP proxy, which are willing to at least one of trust or service the other, session keys using protocols,
   the protocols include one of: Secure Socket Language (SSL) or MashSSL, and the session keys are used to encrypt the user information to prevent the user information from being seen.

6. The method according to claim 1, further comprising, requesting, by the user, at a time of authentication by the IdP, that a user identity be anonymized in a response to the SP.

7. A method comprising:
   issuing, by a Certificate Authority (CA), anonymous certificates to cooperate to allow a federation protocol to run between an Identity Provider (IdP) and a Service Provider (SP) with Identity Exchange (IE) being present;
   assigning, by an Identity Exchange Discovery Service (IEDS) server, an anonymous domain name and associated internet protocol (IP) address to each of an Identity Provider (IdP) proxy, and a Service Provider (SP) proxy, wherein the IEDS server maintains a mapping between actual names of the proxies and their assigned anonymous domain names, and wherein an Identity Exchange function of the IEDS server acts as a switchboard between a plurality of SPs and a plurality of IdPs in a federation;
   obtaining, by the IdP proxy, the anonymous domain name and the associated IP address of the SP proxy, and obtaining, by the SP Proxy, the anonymous domain name and IP address of the IdP proxy; and
   when a user attempts to access a protected resource of an SP that corresponds to the SP proxy;
   redirecting, by the SP, the user to the IEDS server;
   prompting, by the IEDS server, a user to select an IdP from a list of the plurality of IdPs;
   redirecting, by the IEDS server, the user back to the SP while providing the anonymous domain name of the selected IdP;
   redirecting, by the SP, the user to the SP proxy with a federation request,
   encrypting, by the SP proxy, user identifiable data and redirecting, by the SP proxy, the user to the Identity Exchange,
   performing, by the Identity Exchange, any protocol manipulation necessary and redirecting, by the Identity Exchange, the user to the IdP proxy, wherein the IdP proxy decrypts the user identifiable data, and redirects the user to the IdP, authenticating, by the IdP, the user, and then redirecting, by the IdP, the user to the IdP proxy, which encrypts all user information, and redirects to the Identity Exchange, performing, by the Identity Exchange, any protocol manipulation necessary and redirecting to the SP proxy, decrypting, by the SP proxy, a transaction and in turn redirecting the user to the SP, and consuming, by the SP, an identity assertion and deciding, by the SP, whether to permit the user access, wherein the IdP provides identity assertions, and the SP consumes the identity assertions.

8. The method according to claim 7, wherein at least one of the Identity Exchange, the IdP, the SP, the IdP proxy or the SP proxy is issued a short lived anonymous certificate by the CA, to which the at least one of the Identity Exchange, the IdP, the SP, the IdP proxy or the SP proxy authenticate using regular long lived certificates, wherein the short lived anonymous certificate is not as long as the regular long lived certificates.

9. The method according to claim 7, further comprises:
issuing, by the IEDS server, anonymized Domain Name Service (DNS) entries with the associated IP addresses to at least one of the IdP, the SP, the IdP proxy or the SP proxy, maintaining, by the IEDS server, a first list of SPs that an organization associated with the IdP is willing to service, maintaining, by the IEDS server, a second list of IdPs that the SP trusts, and when the SP redirects the user to the IEDS server, showing the user, by the IEDS server, a third list of IdPs that the SP trusts that are willing to service the SP, wherein the maintaining includes at least one of: creating, reading, updating or deleting.

10. The method according to claim 7, wherein the IdP proxy and the SP proxy are each hosted as a cloud service, which are one of on-premise or integrated completely into respective IdP or SP software.

11. The method according to claim 7, wherein
the method further comprises, exchanging, by the IdP proxy and the SP proxy, which are willing to at least one of trust or service the other, session keys using protocols,
the protocols include one of: Secure Socket Language (SSL) or MashSSL, and
the session keys are used to encrypt the user information to prevent the user information from being seen.

12. The method according to claim 7, further comprising, requesting, by the user, at a time of authentication by the IdP, that a user identity be anonymized in a response to the SP.

* * * * *